US007698034B2

(12) United States Patent
Ghoneim

(10) Patent No.: US 7,698,034 B2
(45) Date of Patent: Apr. 13, 2010

(54) INTEGRATING ACTIVE FRONT STEERING AND VEHICLE STABILITY BRAKE CONTROL

(75) Inventor: Youssef A Ghoneim, Macomb Township, MI (US)

(73) Assignee: GM Global Technology Operations, Inc.

( * ) Notice: Subject to any disclaimer, the term of this patent is extended or adjusted under 35 U.S.C. 154(b) by 614 days.

(21) Appl. No.: 10/751,865

(22) Filed: Jan. 6, 2004

(65) Prior Publication Data
US 2005/0149243 A1 Jul. 7, 2005

(51) Int. Cl.
B60T 8/32 (2006.01)
G06F 17/00 (2006.01)
G06F 19/00 (2006.01)
(52) U.S. Cl. .............................. 701/41; 701/48; 701/70; 701/71; 701/78; 701/79; 303/121; 303/138; 303/139; 303/140; 303/146; 280/5.502; 280/5.503; 280/5.506; 280/5.505; 280/5.51
(58) Field of Classification Search ............. 701/41–79; 180/234–440; 280/5.502–5.51; 303/121–147
See application file for complete search history.

(56) References Cited
U.S. PATENT DOCUMENTS

| 5,642,281 | A | * | 6/1997 | Ishida et al. ................... 701/41 |
|---|---|---|---|---|
| 5,702,165 | A | * | 12/1997 | Koibuchi ..................... 303/146 |
| 5,720,533 | A | | 2/1998 | Pastor et al. |
| 5,746,486 | A | | 5/1998 | Paul et al. |
| 5,895,433 | A | * | 4/1999 | Chen et al. ..................... 701/41 |
| 5,941,919 | A | | 8/1999 | Pastor et al. |
| 6,035,251 | A | * | 3/2000 | Hac et al. ..................... 701/70 |
| 6,141,616 | A | * | 10/2000 | Auffhammer et al. ......... 701/70 |
| 6,174,263 | B1 | * | 1/2001 | Tabata et al. .................. 477/97 |
| 6,205,391 | B1 | * | 3/2001 | Ghoneim et al. .............. 701/70 |
| 6,226,587 | B1 | * | 5/2001 | Tachihata et al. ............. 701/72 |
| 6,374,162 | B1 | * | 4/2002 | Tanaka et al. .................. 701/1 |
| 6,494,281 | B1 | * | 12/2002 | Faye et al. .................. 180/197 |
| 2003/0213640 | A1 | * | 11/2003 | Kato et al. .................. 180/446 |
| 2004/0102886 | A1 | * | 5/2004 | Lin et al. ....................... 701/70 |
| 2004/0262991 | A1 | * | 12/2004 | Anwar ......................... 303/147 |

* cited by examiner

Primary Examiner—Jack W. Keith
Assistant Examiner—Chuong P Nguyen
(74) Attorney, Agent, or Firm—Harness, Dickey & Pierce, P.L.C.

(57) ABSTRACT

An integrated vehicle control system includes a first control system having a maximum authority to selectively operate a first vehicle sub-system and a second control system to selectively operate a second vehicle sub-system. A controller is adapted to monitor a first parameter associated with the first vehicle sub-system and a second parameter associated with the second vehicle sub-system. The controller is operable to control the first and second parameters by selectively invoking operation of the second control system when the first control system exceeds the maximum authority and the second parameter exceeds an upper threshold.

24 Claims, 2 Drawing Sheets

INTEGRATING ACTIVE FRONT STEERING AND VEHICLE STABILITY BRAKE CONTROL

FIELD OF THE INVENTION

The present invention relates to vehicle control systems, and more particularly to integrating sub-system control.

BACKGROUND OF THE INVENTION

Modern vehicles incorporate a number of active vehicle control sub-systems that enhance comfort and safety. Two such vehicle control sub-systems include an active front steering (AFS) system and a vehicle stability enhancement (VSE) system.

The AFS system electronically varies the steering ratio based on the intended steering angle, vehicle speed, road conditions and feedback control. Vehicle steering is more direct under normal road conditions at low and medium speeds, reducing operator steering effort. The AFS system also increases vehicle agility in city traffic or for parking maneuvers. Vehicle steering becomes less direct at higher vehicle speeds improving directional stability. Steering stiffens during high speed cornering or sudden maneuvers by monitoring the vehicle yaw rate.

The VSE system assists the vehicle operator in controlling vehicle handling on surfaces such as wet or uneven pavement, ice, snow or gravel. The VSE system also helps the vehicle operator maintain control during rapid or emergency maneuvers. The VSE system recognizes wheel skid based on sensor inputs from wheel speed sensors, steering angle sensors, vehicle speed and a yaw rate sensor. After analyzing the various inputs, the VSE system reduces engine torque and applies braking to maintain vehicle travel along the intended path.

The development of such vehicle control sub-systems reaches a natural limit that presents a compromise in fulfilling contradicting requirements of vehicle comfort, stability, performance and cost. Superimposing the control of each sub-system is not always the most effective means in achieving total vehicle performance.

SUMMARY OF THE INVENTION

Accordingly, the present invention provides an integrated vehicle control system including a first control system having a maximum authority to selectively operate a first vehicle sub-system and a second control system to selectively operate a second vehicle sub-system. A controller is adapted to monitor a first parameter associated with the first vehicle sub-system and a second parameter associated with the second vehicle sub-system. The controller is operable to control the first and second parameters by selectively invoking operation of the second control system when the first control system exceeds the maximum authority and the second parameter exceeds an upper threshold.

In one feature, the first parameter is a steering angle and the first control system includes a steering system that generates a steering angle command based on a steering angle input. The integrated vehicle control system further includes a steering angle sensor that measures a vehicle steering angle. The first control system exceeds the maximum authority when the steering angle command exceeds a steering angle threshold.

In another feature, the second control system includes a vehicle stability enhancement system. The integrated vehicle control system further includes a second sensor that generates a signal upon which the second parameter is based. The second sensor includes one of a yaw rate sensor that measures a vehicle yaw rate and a lateral accelerometer that measures a vehicle lateral acceleration.

In another feature, the second vehicle parameter includes one of a yaw rate error and a yaw rate error acceleration. The yaw rate error is a difference between a yaw rate measured by the second sensor and a yaw rate command generated by the controller. The controller invokes operation of the second control system when one of the yaw rate error exceeds a yaw rate error upper threshold and the yaw rate error acceleration exceeds a yaw rate error acceleration upper threshold.

In another feature, the controller segregates operation of the first and second control systems when one of the yaw rate error is less than a yaw rate error lower threshold and the yaw rate error acceleration is less than a yaw rate error acceleration lower threshold for a threshold period.

In still another feature, the second parameter further includes a velocity and a lateral velocity rate. The controller invokes operation of the first and second control systems when the velocity exceeds a velocity threshold and the lateral velocity rate exceeds a lateral velocity rate threshold.

In yet another feature, the controller segregates operation of the first and second control systems when the second vehicle parameter is less than a lower threshold for a threshold period.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
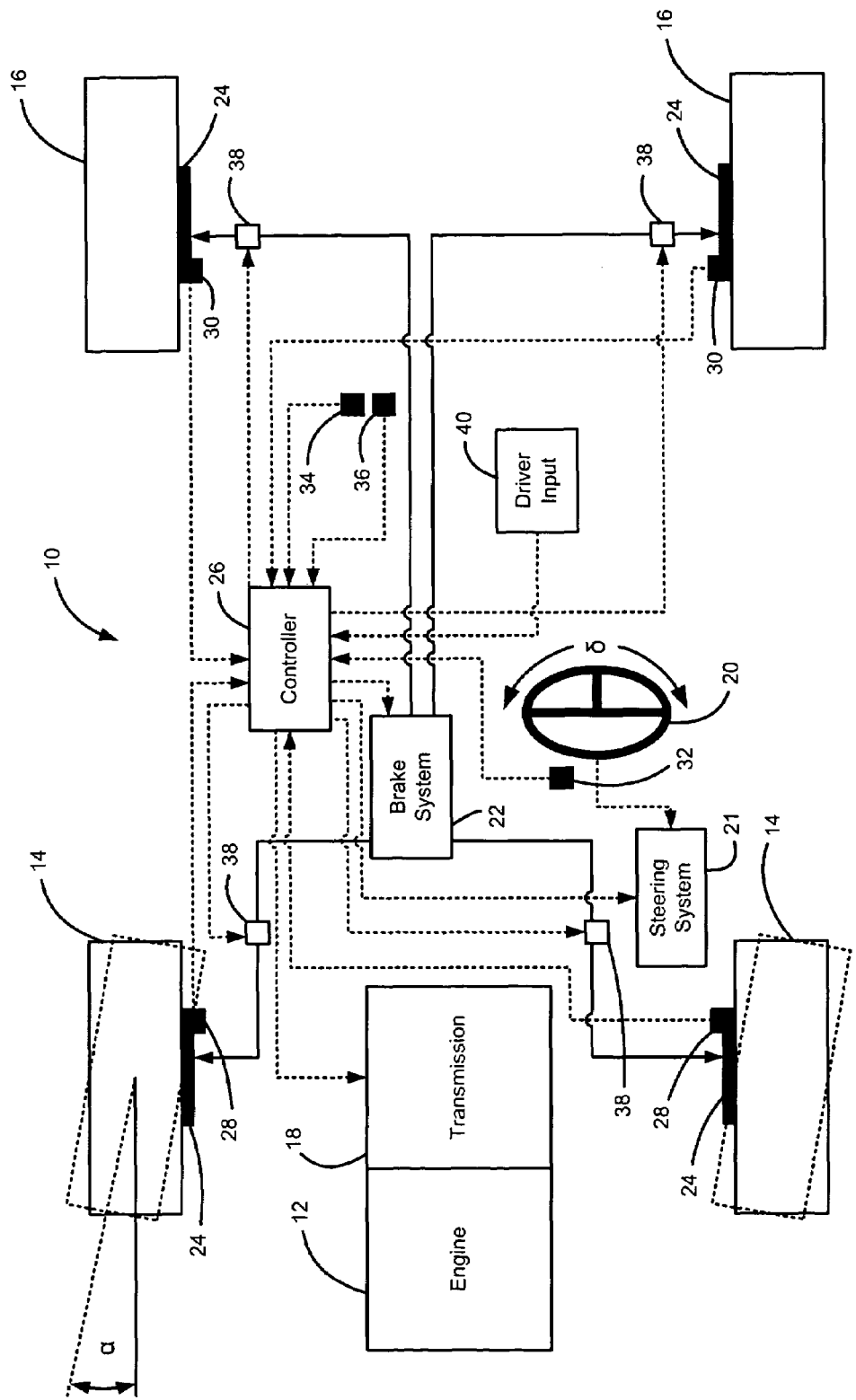
FIG. 1 is a schematic illustration of a vehicle including an active front steering (AFS) system and a vehicle stability enhancement (VSE) system.

Referring now to FIG. 1, a vehicle 10 is schematically illustrated. The vehicle 10 includes an engine 12 that produces driving torque that is transferred to front and/or rear road wheels 14, 16, respectively. The driving torque is transferred through a transmission 18 to the road wheels 14, 16. A steering wheel 20 enables a vehicle operator to steer the front road wheels 14 to a desired steering angle ($\alpha$). More specifically, the steering wheel 20 is an input to a steering system 21 that steers the front road wheels 14. The vehicle 10 also includes a brake system 22 having a master cylinder (not shown) that feeds pressurized fluid to brakes 24 located at each of the road wheels 14, 16.

The vehicle 10 includes a controller 26 that monitors and controls vehicle operation based on the integrated control of the present invention. Wheel speed sensors 28, 30 generate wheel speed signals for the road wheels 14, 16, respectively, which are communicated to the controller 26. A steering wheel angle sensor 32 generates a steering wheel angle signal that is received by the controller 26. A steering wheel angle ($\delta$) is determined based on the steering wheel angle signal. A yaw rate sensor 34 generates a yaw rate signal and a lateral accelerometer 36 generates a lateral acceleration signal, both of which are communicated to the controller 26. The controller 26 controls brake actuators 38 associated with each brake 24 to modulate brake force to the road wheels 14, 16. The controller 26 actively controls the brakes 24 based on the integrated control described herein.

The vehicle operator manipulates a driver input 40 that signals the controller 26. The driver input 40 can include a throttle, cruise control or a brake pedal. In the case of a throttle or cruise control, the driver input 40 generates an engine torque command and the controller 26 operates the engine based on the engine torque command. In the case of a brake pedal, the driver input 40 generates a brake command and the controller 26 operates the braking system to control braking of the road wheels based on the brake command.

The vehicle includes an active front steering (AFS) system and vehicle stability enhancement (VSE) system. The AFS system and VSE system incorporate the various sensors and actuators described herein and control vehicle operation via the controller 26. More particularly, the AFS and VSE systems include software-based algorithms processed by the controller 26 as well as mechanical components. Control signals generated by the controller 26 are based on the software-based algorithms. The control signals control operation of the mechanical components associated with the AFS and VSE systems.

The AFS system electronically influences the steering angle ($\alpha$) of the road wheels 14 based on operator steering input (i.e., steering wheel angle ($\delta$)) and vehicle speed. The AFS system also influences the steering angle ($\alpha$) based on feedback from sensors such as the yaw rate sensor 34. The controller 26 generates a corrected steering angle ($\alpha_{CORR}$) that is greater than, equal to or less than a target steering angle ($\alpha_{TARGET}$) based on the steering wheel angle ($\delta$). In other words, the AFS system can turn the road wheels 14 at angle that is different than the indicated angle to which the vehicle operator turns the steering wheel 20. The AFS system has limited authority in the amount of steering angle it can correct. For example, the AFS system will limit $\alpha_{CORR}$ to a threshold ($\alpha_{THRESH}$) if necessary. Such a condition occurs if when a vehicle operator inputs too much steering for a given vehicle speed.

The VSE system aids the vehicle operator in controlling the vehicle 10 when driving on dangerous surfaces including wet pavement, ice, snow and gravel or when the vehicle operator makes sudden maneuvers. The VSE system includes various sensors that help determine wheel skid. More particularly, the VSE system monitors the relationship between $\delta$ and $\alpha_{CORR}$, the vehicle speed, yaw rate and other factors. The VSE system reduces engine torque and selectively actuates one or more of the brakes 24 to maintain vehicle movement along an intended path. More particularly, the controller 26 generates a yaw rate command ($YR_{COM}$) based on steering angle and vehicle speed. A yaw rate error ($YR_{ERR}$) is determined as the difference between $YR_{COM}$ and the measured yaw rate ($YR_{MEAS}$). $YR_{MEAS}$ is determined based on the yaw rate signal generated by the yaw rate sensor. The VSE system operates to minimize the yaw rate error ($YR_{ERR}$).

The controller 26 calculates an estimated yaw rate error ($YR_{ERREST}$) according to the following equation:

$$YR_{ERREST}(k) = (1 - T \cdot G_1) YR_{ERREST}(k-1) + T \cdot G_1 \cdot YR_{ERR} + T \cdot YR_{ERRACCEL}(k-1)$$

where:
k=current time step;
k−1=previous time step;
T=sampling interval (e.g., 10 msec);
$G_1$=constant; and
$YR_{ERRACCEL}$=yaw rate error acceleration.

$G_1$ is calculated according to the following equation:

$$G_1 = 4 \zeta \pi f_n$$

where:
$\zeta$=damping coefficient (e.g., 0.707); and
$f_n$=frequency coefficient (e.g., 2 Hz).

The controller 26 also determines $YR_{ERRACCEL}$, which is the rate at which $YR_{ERR}$ is changing. $YR_{ERRACCEL}$ is calculated based on the following relationship:

$$YR_{ERRACCEL}(k) = YR_{ERRACCEL}(k-1) + T \cdot G_2 (YR_{ERR}(k) - YR_{ERREST}(k))$$

where:
$G_2$=constant.

$G_2$ is calculated according to the following equation:

$$G_2 = (2 \pi f_n)^2$$

The VSE system selectively actuates on or more brakes 24 and/or reduces engine output torque to minimize $YR_{ERRACCEL}$.

A lateral velocity rate ($V_{LAT}$) is calculated based on the following equation:

$$V_{LAT} = \left(\frac{VR_{MEAS}}{57.3}\right)\left(\frac{V}{3.6}\right) - 9.81 A_{LAT}$$

where:
V=vehicle velocity; and
$A_{LAT}$=lateral acceleration.

V is determined by the controller 26 based on the wheel speed signals generated by the wheel speed sensors 28, 30. $A_{LAT}$ is determined based on the lateral acceleration signal generated by the lateral accelerometer 36.

More detailed descriptions of the AFS and VSE systems are provided in U.S. Pat. No. 5,720,533, issued Feb. 24, 1998 and entitled Brake Control System, U.S. Pat. No. 5,746,486, issued May 5, 1998 and entitled Brake Control System and U.S. Pat. No. 5,941,919, issued Aug. 24, 1999 and entitled Chassis Control System, the disclosures of which are incorporated herein by reference. U.S. Pat. Nos. 5,720,533, 5,746,486 and 5,941,919 disclose exemplary methods for determining $YR_{COM}$.

The controller 26 also executes AFS and VSE system diagnostics to determine whether the AFS system and VSE system are functioning properly. More particularly, the diagnostics periodically check function and rationality of the various sensors and functioning of the various actuators used to implement the AFS and VSE control. If all of the sensors and actuators are functioning properly, the diagnostic indicates that the particular system is operative or healthy. If any of the sensors or actuators are not functioning properly, the diagnostic indicates that the particular system is non-operative or unhealthy. In the event that one or both the AFS system and the VSE system are deemed unhealthy, an alert is issued. The alert can be visual, audible or both.

Figure 2:
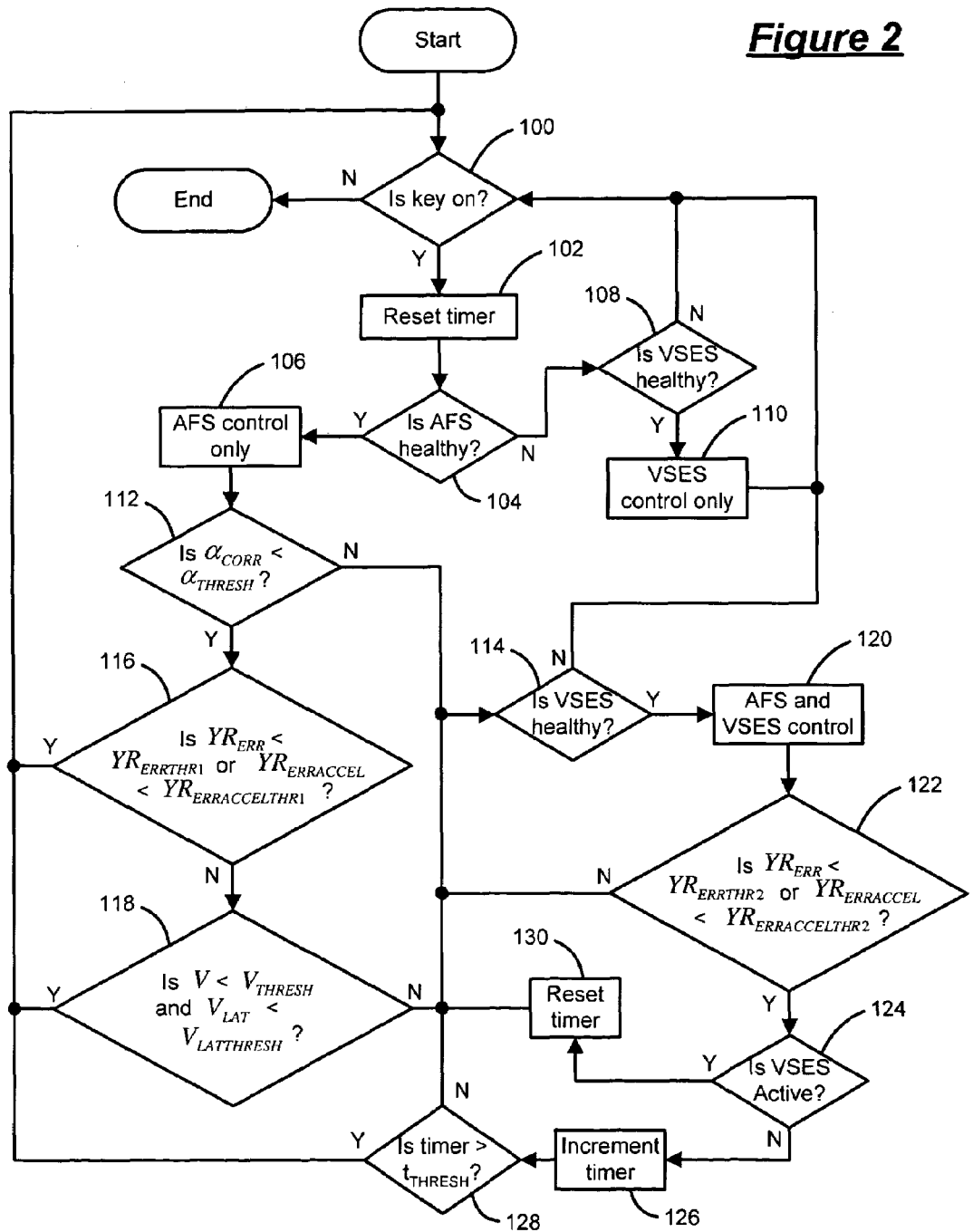
FIG. 2 is a flowchart illustrating an integrated control according to the present invention.

Referring now to FIG. 2, the integrated control (hereinafter "control") of the present invention will be described in detail.

In step 100, control determines whether a key is on. More particularly, control determines whether the vehicle 10 is operating. If the key is on, control continues in step 102. If the key is not on, control ends. Control resets a timer in step 102. The timer times the amount of time the VSE control is operating, as discussed in further detail below.

In step 104, control determines whether the AFS system is healthy (i.e., operative) based on a signal generated by the AFS diagnostic. If the AFS system is healthy, control continues in step 106. If the AFS system is not healthy, control determines whether the VSE system is healthy in step 108 based on a signal generated by the VSE diagnostic. If the VSE system is not healthy, control loops back to step 100. If the VSE system is healthy, control continues in step 110 to operate the vehicle using VSE control only. In this manner, if neither the AFS or VSE systems are healthy, control continuously loops and re-checks the AFS and VSE systems until either the key is off or at least one of the AFS and VSE systems become healthy. If only the VSE system is healthy, as shown at step 110, control continues to loop back to step 100 to determine if the AFS system becomes healthy.

In step 106, control operates the vehicle 10 using AFS control only. Control checks a first condition in step 112. More particularly, control compares $\alpha_{CORR}$ to $\alpha_{THRESH}$, to determine whether the AFS control is attempting to exceed its authority. If $\alpha_{CORR}$ is not less than $\alpha_{THRESH}$, the first condition is not satisfied and control continues in step 114. If $\alpha_{CORR}$ is less than $\alpha_{THRESH}$, the first condition is satisfied and control checks a second condition in step 116. The second condition indicates whether $YR_{ERR}$ and $YR_{ERRACCEL}$ are below respective upper thresholds. If so, the AFS system alone is sufficient to control the vehicle 10. Specifically, control determines whether $YR_{ERR}$ is less than $YR_{ERRTHR1}$ or whether $YR_{ERRACCEL}$ is less than $YR_{ERRACCELTHR1}$. If either $YR_{ERR}$ is less than $YR_{ERRTHR1}$ or $YR_{ERRACCEL}$ is less than $YR_{ERRACCELTHR1}$, then the second condition is satisfied and control loops back to step 100. If either $YR_{ERR}$ is not less than $YR_{ERRTHR1}$ or $YR_{ERRACCEL}$ is not less than $YR_{ERRACCELTHR1}$, then the second condition is not satisfied and control continues in step 118.

Control checks a third condition in step 118, which indicates whether V and $V_{LAT}$ are below respective thresholds. If so, the VSE system is not employed to assist the AFS system in maintaining vehicle control. More particularly, control determines whether V is less than $V_{THRESH}$ and whether $V_{LAT}$ is less than $V_{LATTHRESH}$. If V is less than $V_{THRESH}$ and $V_{LAT}$ is less than $V_{LATTHRESH}$, the third condition is satisfied and control loops back to step 100. If V is not less than $V_{THRESH}$ or $V_{LAT}$ is not less than $V_{LATTHRESH}$, the third condition is not satisfied and control continues in step 114.

To summarize the integrated control to this point, in step 106, control controls the vehicle 10 using AFS control only. In steps 112, 116 and 118, control checks first, second and third conditions, respectively. If the first condition is not satisfied (i.e., $\alpha_{CORR}$ is equal to or exceeds $\alpha_{THRESH}$), control determines that AFS control alone is insufficient to stabilize vehicle handling and seeks to integrate VSE control, as described in further detail below. If the first condition is satisfied, control checks the second and third conditions. If neither the second nor third conditions are satisfied, control seeks to integrate VSE control, as described in further detail below. In this manner, AFS control is used to the maximum of its capability before VSE control is implemented to further assist in stabilizing vehicle handling.

In step 114, control determines whether the VSE system is healthy. If the VSE system is not healthy, control loops back to step 100. If the VSE system is healthy, control controls the vehicle 10 using both AFS and VSE control in step 120. More particularly, the AFS system adjusts $\alpha_{CORR}$ and the VSE system selectively actuates one or more brakes 24 and/or reduces engine output torque to reduce $YR_{ERR}$ and $YR_{ERRACCEL}$. In this manner, vehicle yaw rate is controlled and the vehicle 10 travels along the intended path.

In step 122, control checks a fourth condition, which indicates whether $YR_{ERR}$ or $YR_{ERRACCEL}$ are less than respective lower thresholds. More particularly, control determines whether $YR_{ERR}$ is less than $YR_{ERRTHR2}$ or whether $YR_{ERRACCEL}$ is less than $YR_{ERRACCELTHR2}$. If neither $YR_{ERR}$ is less than $YR_{ERRTHR2}$ nor $YR_{ERRACCEL}$ is less than $YR_{ERRACCELTHR2}$, the fourth condition is not satisfied and control loops back to step 114. If either $YR_{ERR}$ is less than $YR_{ERRTHR2}$ or $YR_{ERRACCEL}$ is less than $YR_{ERRACCELTHR2}$, the fourth condition is satisfied and control continues in step 124. In this manner, control controls the vehicle 10 using both AFS and VSE control until either $YR_{ERR}$ or $YR_{ERRACCEL}$ are less than their lower thresholds.

In step 124, control checks a fifth condition, which indicates whether the VSE control is still active. Generally, if the fourth condition is satisfied, the VSE control becomes inactive as it is not required to bring either $YR_{ERR}$ or $YR_{ERRACCEL}$ below their respective thresholds (i.e., $YR_{ERRTHR2}$ and $YR_{ERRACCELTHR2}$, respectively). However, there may be some instances where the VSE control remains active even though the fourth condition is satisfied. For example, the VSE control may be registered as active, immediately after the fourth condition is satisfied. If the VSE control is active, the fifth condition is satisfied and control continues in step 130. Control resets the timer in step 130 and loops back to step 114. If the VSE control is not active, the fifth condition is not satisfied and control continues in step 126.

In step 126, control increments the timer. In step 128, control checks a sixth condition, which indicates whether the timer has exceeded a timer threshold ($t_{THRESH}$). If the timer exceeds $t_{THRESH}$, the sixth condition is satisfied and control loops back to step 100. If the timer does not exceed $t_{THRESH}$, the sixth condition is not satisfied and control loops back to step 114.

Steps 114 and 120 through 130 enable integrated AFS and VSE control to bring $YR_{ERR}$ or $YR_{ERRACCEL}$ below their respective thresholds. Once the integrated control succeeds in bringing $YR_{ERR}$ or $YR_{ERRACCEL}$ below their respective thresholds, control ensures that VSE remains inactive afterward for $t_{THRESH}$. In this manner, the yaw rate characteristics are within acceptable limits below (i.e., the lower thresholds) for at least the time $t_{THRESH}$ and the VSE control is not intermittently activated. If VSE control again becomes active before the timer exceeds $t_{THRESH}$, the timer is reset in step 130. If VSE control remains inactive for $t_{THRESH}$, control begins again at step 100.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An integrated vehicle control system, comprising:
   a first control system configured to selectively operate a first vehicle sub-system,
   wherein the first control system includes a steering system that generates a command to operate the first vehicle sub-system;
   a second control system configured to selectively operate a second vehicle sub-system comprising an actuator;

wherein said second control system includes a vehicle stability enhancement system; and a controller configured to:

determine a priority between said first control system and said second control system, and whereby invokes said first control system, and monitor a first parameter associated with said first vehicle sub-system and a second parameter associated with said second vehicle sub-system, said controller being configured to control said first and second parameters by selectively invoking operation of said second control system only when said first parameter exceeds a first threshold and said second parameter exceeds a second upper threshold.

2. The integrated vehicle control system of claim 1 wherein said first parameter is a steering angle and said first control system generates a steering angle command based on a steering angle input.

3. The integrated vehicle control system of claim 2 further comprising a steering angle sensor that measures a vehicle steering angle.

4. The integrated vehicle control system of claim 3 wherein said first parameter exceeds said first threshold if said steering angle command exceeds a steering angle threshold.

5. The integrated vehicle control system of claim 1 further comprising a sensor that generates a signal indicative of yaw rate.

6. The integrated vehicle control system of claim 5 wherein said sensor includes one of a yaw rate sensor that measures a vehicle yaw rate and a lateral accelerometer that measures a vehicle lateral acceleration.

7. The integrated vehicle control system of claim 6 wherein said second parameter includes one of a yaw rate error and a yaw rate error acceleration.

8. The integrated vehicle control system of claim 7 wherein said yaw rate error is a difference between a yaw rate measured by said a sensor and a yaw rate command generated by said controller.

9. The integrated vehicle control system of claim 8 wherein said controller invokes operation of said second control system when one of said yaw rate error exceeds a yaw rate error upper threshold and said yaw rate error acceleration exceeds a yaw rate error acceleration upper threshold.

10. The integrated vehicle control system of claim 9 wherein said controller segregates operation of said first and second control systems when one of said yaw rate error is less than a yaw rate error lower threshold and said yaw rate error acceleration is less than a yaw rate error acceleration lower threshold for a threshold period.

11. The integrated vehicle control system of claim 7 wherein said second parameter further includes a velocity and a lateral velocity rate.

12. The integrated vehicle control system of claim 11 wherein said controller invokes operation of said first and second control systems when said velocity exceeds a velocity threshold and said lateral velocity rate exceeds a lateral velocity rate threshold.

13. The integrated vehicle control system of claim 1 wherein said controller segregates operation of said first and second control systems if said second vehicle parameter is less than a lower threshold for a threshold period.

14. A vehicle having an integrated vehicle control system, comprising:

a first control system configured to selectively and independently operate an active steering system;

a second control system configured to selectively and independently operate a vehicle drivetrain comprising a brake actuator; and a controller configured to:

determine a priority between said first control system and said second control system, and whereby invokes said first control system, and monitor a first parameter associated with said active steering system, said controller being configured to selectively invoke operation of said second control system when said first parameter exceeds a threshold, wherein said controller is configured to monitor a second parameter associated with said vehicle drivetrain and wherein said controller is configured to selectively invoke operation of said second control system when said second parameter exceeds an upper threshold.

15. The vehicle of claim 14 wherein said first parameter includes a steering angle.

16. The vehicle of claim 15 wherein said first control system exceeds said threshold when a steering angle correction generated by said first control system exceeds a steering angle correction threshold.

17. The vehicle of claim 14 wherein said second control system is a vehicle stability enhancement (VSE) system that controls a second parameter.

18. The vehicle of claim 17 wherein said second parameter includes at least one of a yaw rate error, yaw rate error, a yaw rate error acceleration, a vehicle velocity, and a vehicle lateral velocity rate.

19. The vehicle of claim 18 further comprising a yaw rate sensor that measures a yaw rate, wherein said yaw rate error is a difference between said measured yaw rate and a yaw rate command generated by said controller.

20. The vehicle of claim 19 further comprising:

a plurality of road wheels; and a plurality of brakes associated with said road wheels, wherein said VSE system actuates braking of said road wheels to achieve said yaw rate command.

21. The vehicle of claim 20 further comprising an engine, wherein said VSE system manipulates a torque output of said engine to achieve said yaw rate command.

22. The vehicle of claim 18 wherein said controller compares said yaw rate error to a yaw rate error upper threshold, compares said yaw rate error acceleration to a yaw rate error acceleration upper threshold, compares said vehicle velocity to a vehicle velocity threshold and compares said vehicle lateral velocity rate to a vehicle lateral velocity rate threshold.

23. The vehicle of claim 22 wherein said controller operates said second control system to control said second parameter if one of said yaw rate error exceeds said yaw rate error upper threshold and said yaw rate error acceleration exceeds said yaw rate error acceleration upper threshold.

24. The vehicle of claim 22 wherein said controller operates said second control system to control said second parameter if said vehicle velocity exceeds said vehicle velocity threshold and said vehicle lateral velocity rate exceeds said vehicle lateral velocity rate threshold.

* * * * *